(12) United States Patent
Inoue et al.

(10) Patent No.: US 9,939,577 B2
(45) Date of Patent: Apr. 10, 2018

(54) DIFFRACTION STRUCTURE, DIFFRACTION GRATING, DIFFRACTION GRATING ARRAY, OPTICAL PHASED ARRAY, OPTICAL MODULATOR, OPTICAL FILTER, LASER SOURCE

(71) Applicant: KABUSHIKI KAISHA TOYOTA CHUO KENKYUSHO, Nagakute-shi, Aichi-ken (JP)

(72) Inventors: Daisuke Inoue, Nagakute (JP); Tadashi Ichikawa, Nagakute (JP); Akari Nakao, Nagakute (JP); Tatsuya Yamashita, Nagakute (JP); Makoto Nakai, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 0 days.

(21) Appl. No.: 15/490,283

(22) Filed: Apr. 18, 2017

(65) Prior Publication Data

US 2017/0307810 A1    Oct. 26, 2017

(30) Foreign Application Priority Data

Apr. 20, 2016  (JP) .................................. 2016-084729
Apr. 17, 2017  (JP) .................................. 2017-081374

(51) Int. Cl.
| | | |
|---|---|---|
| *G02B 6/34* | (2006.01) |
| *G02B 6/124* | (2006.01) |
| *G02B 6/02* | (2006.01) |
| *G02B 6/293* | (2006.01) |
| *G02B 6/12* | (2006.01) |

(52) U.S. Cl.
CPC .............. *G02B 6/021* (2013.01); *G02B 6/124* (2013.01); *G02B 6/29334* (2013.01); *G02B 6/34* (2013.01); *G02B 6/12009* (2013.01)

(58) Field of Classification Search
CPC . G02B 6/124; G02B 6/34; G02B 2006/12107
See application file for complete search history.

(56) References Cited

U.S. PATENT DOCUMENTS

2011/0053095 A1* 3/2011 Sakuma .................. G02B 6/124
430/321

FOREIGN PATENT DOCUMENTS

JP    H05-150109 A    6/1993

OTHER PUBLICATIONS

Sun, Jie et al., "Large-scale nanophotonic phased array", Nature, Jan. 10, 2013, vol. 493, pp. 195-199.

* cited by examiner

*Primary Examiner* — Jerry Rahll
(74) *Attorney, Agent, or Firm* — Oliff PLC

(57) ABSTRACT

A diffraction structure includes a supporting layer, a high refractive index layer, and a low refractive index layer. The high refractive index layer has a first refractive index, is formed above the supporting layer, configures a waveguide guiding input light input from an input terminal along a specific direction, and includes an opening section formed along the specific direction. The low refractive index layer has a second refractive index lower that the first refractive index, and is formed so as to cover the high refractive index layer and fill the opening section. The opening section modifies the input light in at least one of direction or speed according to a wavelength of the input light, and outputs the modified light as output light.

13 Claims, 17 Drawing Sheets

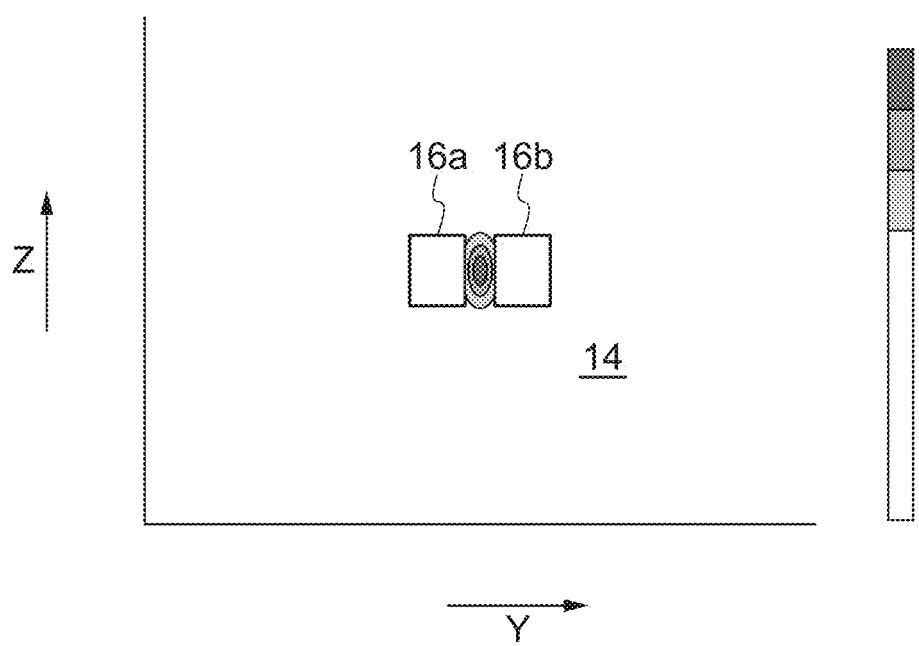

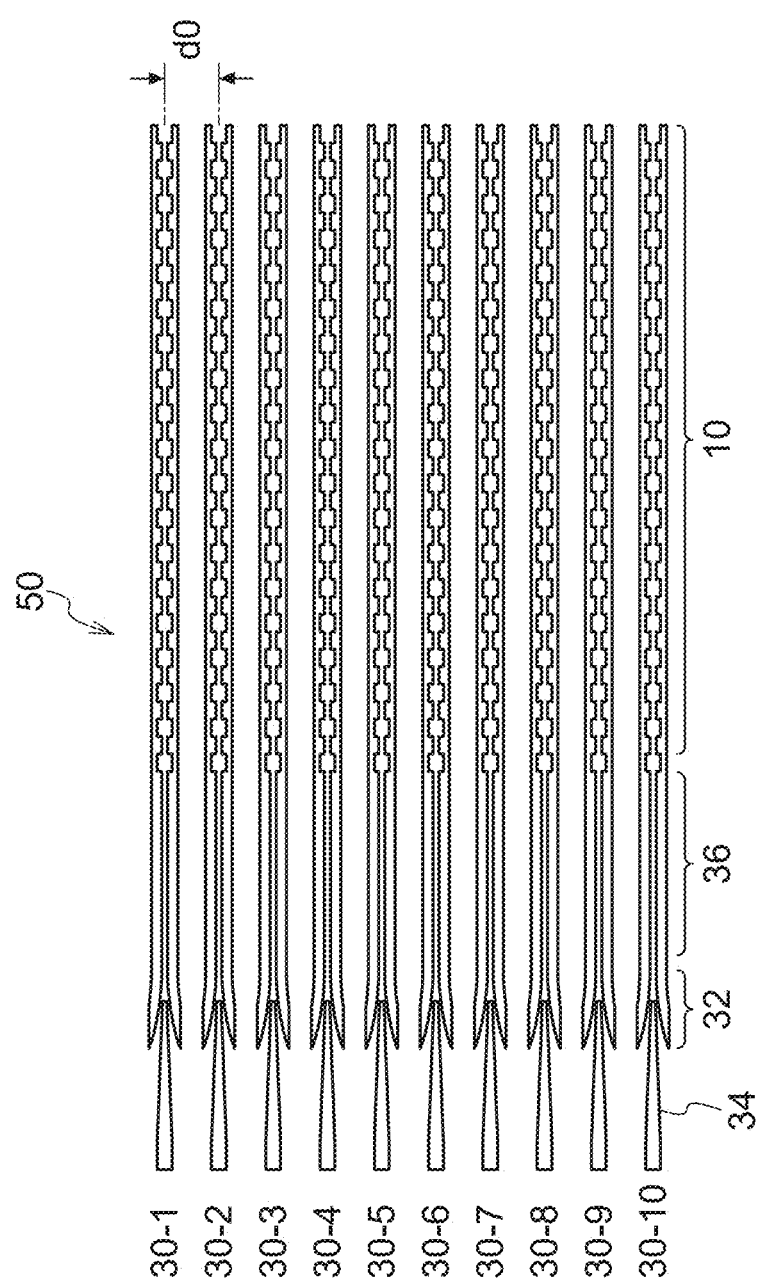

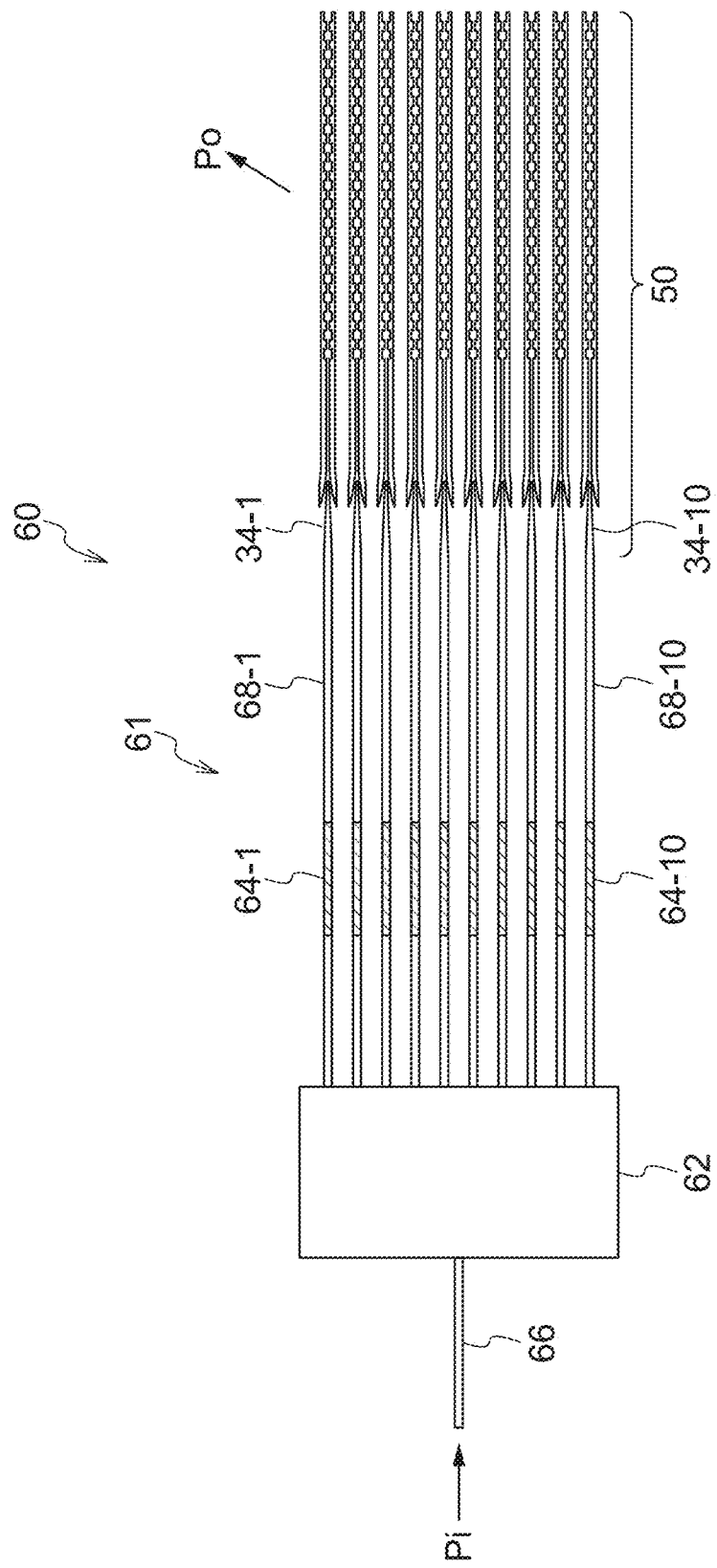

DIFFRACTION STRUCTURE, DIFFRACTION GRATING, DIFFRACTION GRATING ARRAY, OPTICAL PHASED ARRAY, OPTICAL MODULATOR, OPTICAL FILTER, LASER SOURCE

CROSS-REFERENCE TO RELATED APPLICATION

This application is based on and claims priority under 35 USC 119 from Japanese Patent Applications No. 2016-084729 filed on Apr. 20, 2016 and No. 2017-081374 filed on Apr. 17, 2017, the disclosures of which are incorporated by reference herein.

BACKGROUND

Technical Field

The present disclosure relates to a diffraction structure, a diffraction grating, a diffraction grating array, an optical phased array, an optical modulator, an optical filter, and a laser source.

Related Art

An optical phased array is a device that steers light, and is a key device for configuring optical antennas. One known optical phased array configuration is the optical phased array described in "Large-scale nanophotonic phased array" (Nature, Vol. 1493, p. 195-199, 2013), in which phase modulators and diffraction gratings are combined. The optical phased array described in "Large-scale nanophotonic phased array" is configured such that the steering angle can be changed by modulating the phase of light input to respective diffraction gratings disposed in an array pattern.

In general, a diffraction grating is manufactured by performing a grooving process on a grating material (for example, see Japanese Patent Application Laid-Open (JP-A) No. H05-150109).

However, in an optical phased array, phenomena called "grating lobes" are sometimes an issue. Grating lobes refer to secondary radiation components that are radiated in directions other than a primary radiation direction, and, for example, the directivity of light transmitted from a laser radar employing an optical phased array is decreased as a result of large influences from grating lobes.

Grating lobes occur when the condition $d/\lambda > 0.5$ is satisfied, wherein the wavelength of light propagating through the optical phased array is $\lambda$ and the interval between diffraction gratings disposed in an array pattern is d. The number of grating lobes that occur increases as the value of value of $d/\lambda$ increases. In other words, in order to suppress the occurrence of grating lobes, it is necessary to narrow the interval between diffraction gratings.

Regarding this point, as a result of the shape and the like of the diffraction gratings, the interval d between diffraction gratings is at least twice the wavelength $\lambda$ ($d > 2\lambda$) in the optical phased array described in "Large-scale nanophotonic phased array". Thus, it is conceivable that a large number of grating lobes will occur. Accordingly, there is room for improvement with regards to the directivity of the optical phased array.

In a diffraction grating such as that described in JP-A H05-150109, grating lobes can be reduced by, for example, making the depth of grooves shallower using half-etching. However, there are issues with repeatability in half-etching, and the addition of processes for half-etching also results in increased cost. In general, as it is challenging to adjust the depth of grooves using etching, it is difficult to control etching amounts in an optical integrated circuit or the like that employs an optical waveguide. Thus, there is demand for a simple manufacturing method with a different concept to that of the related art.

SUMMARY

A diffraction structure of one aspect of the present disclosure includes a supporting layer, a high refractive index layer, and a low refractive index layer. The high refractive index layer has a first refractive index, is formed above the supporting layer, configures a waveguide guiding input light input from an input terminal along a specific direction, and includes an opening section formed along the specific direction. The low refractive index layer has a second refractive index lower that the first refractive index, and is formed so as to cover the high refractive index layer and fill the opening section. The opening section modifies the input light in at least one of direction or speed according to a wavelength of the input light, and outputs the modified light as output light.

BRIEF DESCRIPTION OF THE DRAWINGS

FIG. 2 is a diagram illustrating light propagation simulation results in a diffraction grating according to a first exemplary embodiment.

FIG. 6 is a plan view illustrating an example of a diffraction grating array according to a second exemplary embodiment.

FIG. 7 is a plan view illustrating an example of configuration of an optical phased array according to a third exemplary embodiment.

DETAILED DESCRIPTION

Detailed explanation follows regarding exemplary embodiments of the present disclosure, with reference to the drawings.

First Exemplary Embodiment

Figure 1A:
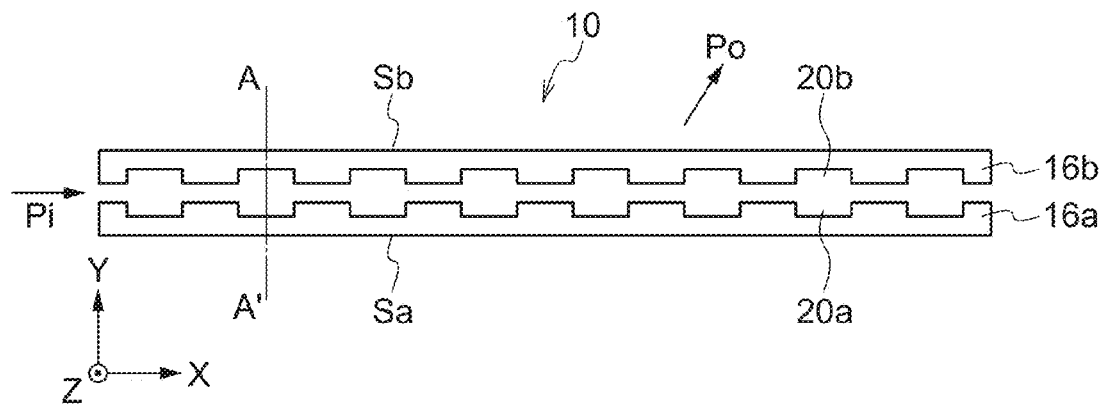
FIG. 1A is a plan view illustrating an example of configuration of a diffraction grating according to a first exemplary embodiment.

Explanation follows regarding a diffraction grating 10 according to an exemplary embodiment, with reference to FIG. 1A to FIG. 5C. The diffraction grating 10 is of a configuration in which a diffraction structure according to the present disclosure is applied to a diffraction grating. FIG. 1A is a plan view of the diffraction grating 10, FIG. 1B is a perspective view of the diffraction grating 10, and FIG. 1C illustrates a cross-section of the diffraction grating 10 taken along line A-A' in FIG. 1A. As illustrated in FIG. 1B, the diffraction grating 10 is configured including a silicon (Si) substrate 12 (supporting layer), side-wall layers 16a, 16b (a high refractive index layer) formed from Si, a cladding layer 14 (a low refractive index layer) formed from $SiO_2$, and recesses 20a, 20b (an opening section; collectively referred to as "recesses 22" hereafter).

Figure 1B:
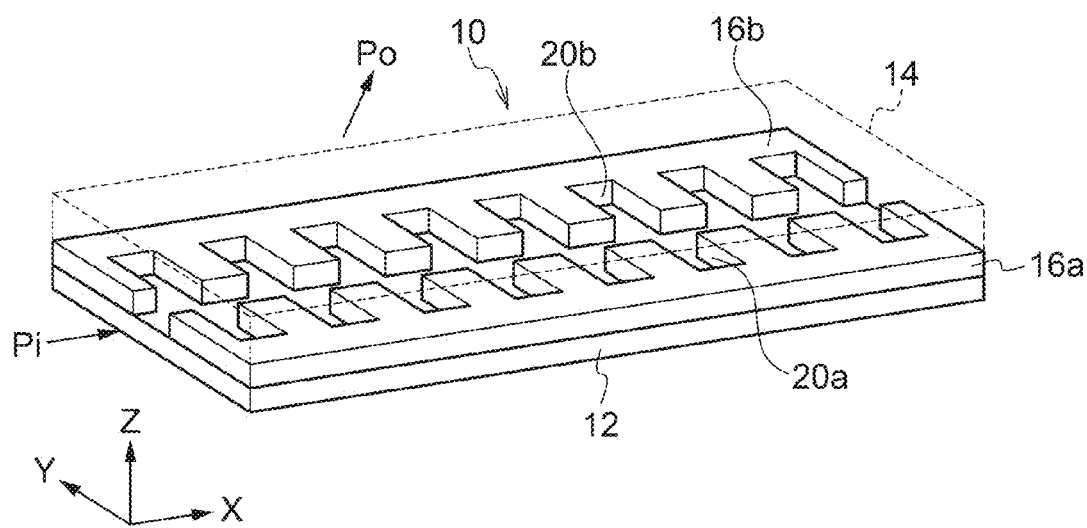
FIG. 1B is a perspective view illustrating an example of configuration of a diffraction grating according to a first exemplary embodiment.

As illustrated in FIG. 1A and FIG. 1B, in the diffraction grating 10, a slot-waveguide is configured by the two side-wall layers 16a, 16b disposed facing each other and a gap provided between the side-wall layers 16a and 16b. The gap between the side-wall layers 16a and 16b is embedded in the cladding layer 14. In the present exemplary embodiment, the refractive index of the side-wall layers 16a, 16b is set higher than the refractive index of the cladding layer 14.

Recesses 20a, 20b that have been notched in the Y-direction are formed along the X-direction in respective side faces of the side-wall layers 16a, 16b. In the diffraction grating 10 according to the present exemplary embodiment, diffraction phenomena occur due to the recesses 20a, 20b. Namely, input light Pi that has been input from one end of the gap between the side-wall layers 16a and 16b (namely, the cladding layer 14) is transmitted through the gap, is diffracted by the diffraction grating formed by the recesses 20a, 20b, and is output as output light Po.

Note that in the present exemplary embodiment, the recesses 20a, 20b are configured so as to be coupled together, to form a series of openings (serial openings), and to divide the high refractive index layer into the side-wall layers 16a (a first layer) and 16b (a second layer). However, there is no limitation thereto, and configuration may be such that the side-wall layers 16a and 16b are connected together at an end face on the opposite side of the diffraction grating 10 to the end face where input light Pi is input.

As described above, in the diffraction grating 10, the recesses 20a, 20b are provided in respective side faces on the sides of the side-wall layers 16a, 16b where light is guided so as to configure a diffraction grating. Thus, side faces Sa, Sb on the opposite side of the respective side-wall layers 16a, 16b to the recesses 20a, 20b do not contribute to the diffraction phenomena. Namely, even if plural diffraction gratings 10 are disposed adjacent to each other, there is no optical coupling between the diffraction gratings 10. The diffraction gratings 10 can therefore be disposed close together in the Y-direction (see FIG. 6).

FIG. 2 illustrates the result of simulating guiding light through the diffraction grating 10. FIG. 2 illustrates the distribution of light resulting from simulating a case in which light is incident on the side-wall layers 16a, 16b disposed inside the cladding layer 14, namely, a case in which light is incident along the X-direction in the cross-section of FIG. 1C. As illustrated in FIG. 2, light incident to the diffraction grating 10 concentrates in the cladding layer 14 between the side-wall layers 16a and 16b, and propagates therethrough.

Figure 3A:
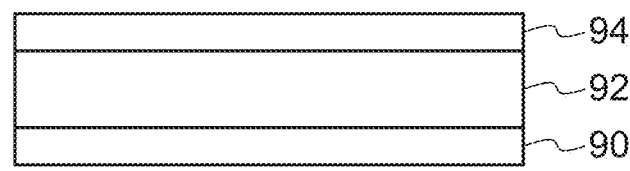
FIG. 3A is a cross-section illustrating an example of a method of manufacturing a diffraction grating according to a first exemplary embodiment.
Figure 3B:
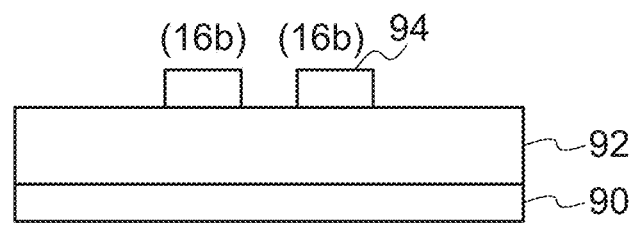
FIG. 3B is a cross-section illustrating an example of a method of manufacturing a diffraction grating according to a first exemplary embodiment.
Figure 3C:
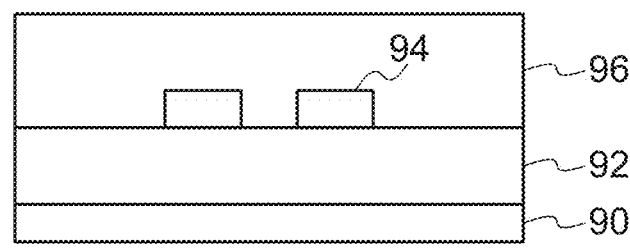
FIG. 3C is a cross-section illustrating an example of a method of manufacturing a diffraction grating according to a first exemplary embodiment.

Explanation follows regarding a method of manufacturing the diffraction grating 10, with reference to FIG. 3A to FIG. 3C.

First, a Si substrate 90, a $SiO_2$ (buried oxide: BOX) layer 92 formed above the substrate 90, and a SOI (silicon on insulator) substrate that includes a Si layer 94 formed above the $SiO_2$ layer 92 are prepared.

Next, the Si layer 94 is processed using photolithography and etching to form the side-wall layers 16a, 16b.

Next, a $SiO_2$ layer 96 is formed above the Si layer 94 and the $SiO_2$ layer 92 using, for example chemical vapor deposition (CVD). The diffraction grating 10 according to the present exemplary embodiment is manufactured through the above manufacturing process. The substrate 90, the Si layer 94, and the SiO$_2$ layer 96 in FIG. 3A to FIG. 3C respectively correspond to the substrate 12, the side-wall layers 16a, 16b, and the cladding layer 14 in FIG. 1A to FIG. 1C.

Figure 1C:
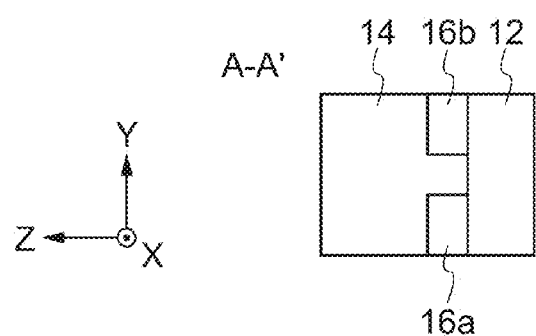
FIG. 1C is a cross-section illustrating an example of configuration of a diffraction grating according to a first exemplary embodiment.

As described above, in the method of manufacturing the diffraction grating 10, the shape of the diffraction grating is determined by in-plane (the X-Y plane illustrated in FIG. 1A to FIG. 1C) processing using a mask, and not by performing processing in the vertical direction (the thickness direction of the diffraction grating 10 and the Z-direction illustrated in FIG. 1A to FIG. 1C) using etching as in the related art. Thus, manufacturing is simplified, and manufacturing precision can be maintained with good repeatability.

Figure 4:
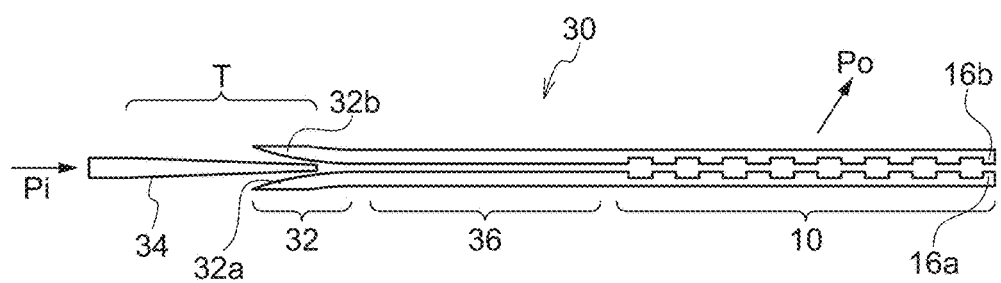
FIG. 4 is a plan view illustrating an example of a single-mode input diffraction grating according to a first exemplary embodiment.

Note that as the diffraction grating 10 is formed as a slot-waveguide, consideration is required with regards to connections with standard waveguides, for example, single-mode rectangular waveguides. FIG. 4 illustrates a single-mode input diffraction grating 30 given such consideration.

As illustrated in FIG. 4, the single-mode input diffraction grating 30 is configured including the diffraction grating 10, a mode converter 32, a single-mode waveguide 34, and a slot-waveguide 36.

The single-mode waveguide 34 allows a single mode of light to propagate therethrough. The single-mode waveguide 34 is, for example, a rectangular waveguide, and a mode converter 32 side of the single-mode waveguide 34 has a taper portion T that has been processed into a tapered shape.

The slot-waveguide 36 is a slot-waveguide that does not include recesses 20a, 20b extending along the side-wall layers 16a, 16b of the diffraction grating 10.

The mode converter 32 is a mode conversion element that converts the single-mode to a slot-mode. The mode converter 32 extends from the slot-waveguide 36, and includes coupling portions 32a, 32b disposed so as to face the taper portion T of the single-mode waveguide 34 and sandwich the taper portion T from both sides.

In the single-mode input diffraction grating 30 configured as above, input light Pi input from one end of the single-mode waveguide 34 is diffracted in the diffraction grating 10 and radiated out as output light Po.

Figure 5A:
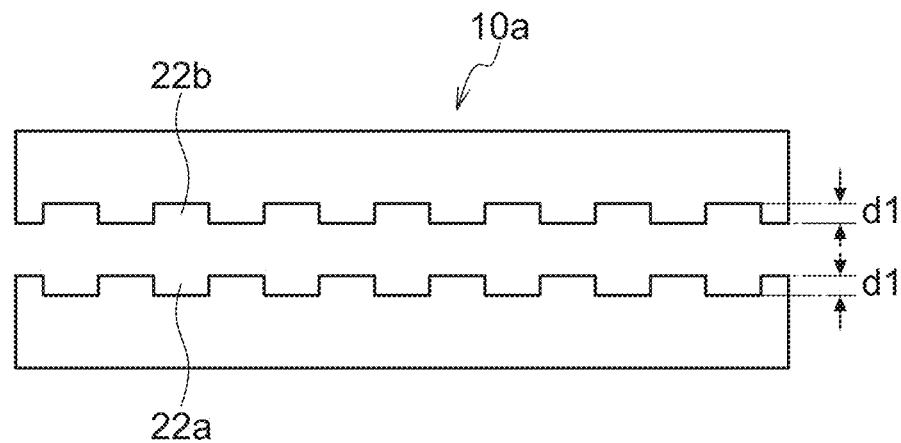
FIG. 5A is a plan view for explaining the adjustment of coupling efficiency in a diffraction grating according to a first exemplary embodiment.
Figure 5B:
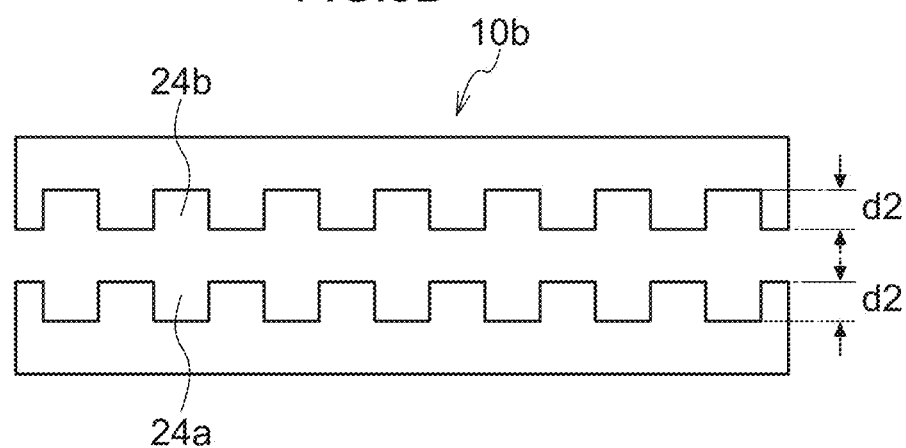
FIG. 5B is a plan view for explaining the adjustment of coupling efficiency in a diffraction grating according to a first exemplary embodiment.
Figure 5C:
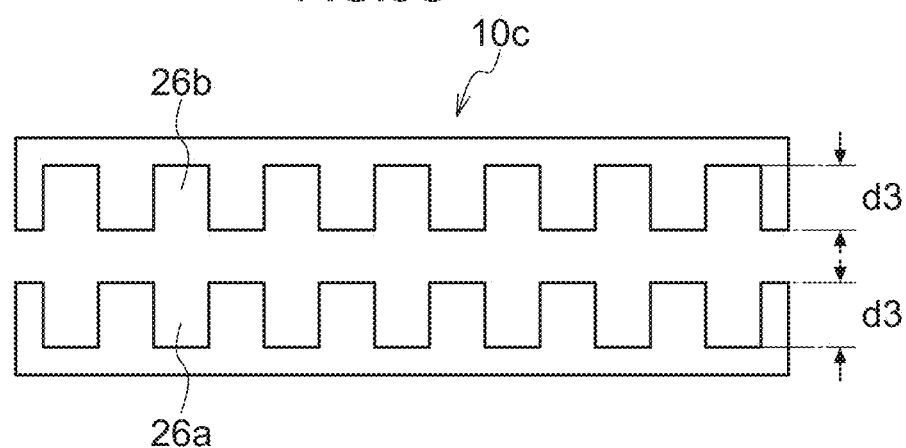
FIG. 5C is a plan view for explaining the adjustment of coupling efficiency in a diffraction grating according to a first exemplary embodiment.

Explanation follows regarding adjusting the coupling efficiency between the diffraction grating and the waveguide in the diffraction grating 10, with reference to FIG. 5A to FIG. 5C. In the diffraction grating 10 according to the present exemplary embodiment, it is possible to adjust coupling efficiency by adjusting the depth of the recesses 20a, 20b. FIG. 5A to FIG. 5C illustrate an example of a configuration in which the coupling efficiency of the diffraction grating 10 has been changed.

As illustrated in FIG. 5A, a diffraction grating 10a includes recesses 22a, 22b, and each recess has a depth of d1. Similarly, a diffraction grating 10b includes recesses 24a, 24b, with each recess having a depth of d2; and a diffraction grating 10c includes recesses 26a, 26b, with each recess having a depth of d3. These depths satisfy the condition d1<d2<d3. Thus, ηa<ηb<ηc, wherein the coupling efficiency of the diffraction grating 10a is ηa, the coupling efficiency of the diffraction grating 10b is ηb, and the coupling efficiency of the diffraction grating 10c is ηc.

As described above, in the diffraction grating 10 according to the present exemplary embodiment, it is possible to adjust the coupling efficiency η between the diffraction grating and the waveguide by adjusting the depth of the recesses 20a, 20b. Since depth processing for the recesses 20a, 20b is in-plane (the X-Y plane in FIG. 1A to FIG. 1C) processing of the diffraction grating 10 by etching using a mask, the processing is simpler than vertical direction (the Z-direction in FIG. 1A to FIG. 1C) processing, and moreover, high precision processing is possible. This enables the degree of control of the output light Po radiation pattern, the degree of suppression of grating lobes, or the like, to be precisely planned.

Further, the adjustment of diffraction efficiency along the propagation direction (the +X-direction in FIG. 1A to FIG. 1C) of light in the diffraction grating is sometimes desired. Namely, optical intensity in the diffraction grating generally decreases as light propagates through the diffraction grating. It is therefore desirable that diffraction efficiency increase along the propagation direction of light in order to emit a uniform output light from the diffraction grating. In such cases, with the diffraction grating 10 according to the present exemplary embodiment, it is possible to adjust the diffraction efficiency by adjusting the depth of the recesses 22, namely, by using a simple manufacturing method in which processing is performed in-plane, and not in the thickness direction of the diffraction grating. This enables the provision of a diffraction grating in which the distribution of diffraction efficiency can be easily set.

As explained in detail above, the diffraction grating according to the present exemplary embodiment enables the occurrence of grating lobes to be suppressed, and enables a simply manufactured diffraction grating to be provided.

Second Exemplary Embodiment

Explanation follows regarding a diffraction grating array 50 according to the present exemplary embodiment, with reference to FIG. 6. The diffraction grating array 50 is of a configuration in which a diffraction structure according to the present disclosure is applied to a diffraction grating array. Plural (ten, in the present exemplary embodiment) of the above single-mode input diffraction gratings 30 are disposed so as to form the diffraction grating array 50.

As illustrated in FIG. 6, single-mode input diffraction gratings 30-1 to 30-10 are disposed parallel to each other so as to configure the diffraction grating array 50. Each of the single-mode input diffraction gratings 30-1 to 30-10 is the same as the single-mode input diffraction grating 30 described above, and thus similar configuration is appended with the same reference numeral, and detailed explanation thereof is omitted.

As described above, each of the single-mode input diffraction gratings 30-1 to 30-10 according to the present exemplary embodiment can be disposed with a small element interval d0, enabling the occurrence of grating lobes to be suppressed. The specific value of the element interval d0 in the diffraction grating array 50 according to the present exemplary embodiment is, for example, 1.2 μm. For the reasons explained above, the occurrence of grating lobes can be effectively suppressed in the diffraction grating array 50 even when the diffraction gratings are arranged close together.

As explained in detail above, the diffraction grating array according to the present exemplary embodiment enables the occurrence of grating lobes to be suppressed, and enables a simply manufactured diffraction grating array to be provided.

Third Exemplary Embodiment

Explanation follows regarding an optical phased array 60 according to the present exemplary embodiment, with reference to FIG. 7. The optical phased array 60 is of a configuration in which a diffraction structure according to the present disclosure is applied to an optical phased array. The optical phased array 60 is of a configuration in which the diffraction grating array 50 above is applied to an optical phased array.

As illustrated in FIG. 7, the optical phased array 60 is configured including the diffraction grating array 50, a phase modulator 61, a multi-mode interference (MMI) coupler 62, and an input waveguide 66.

The input waveguide 66 allows the input of input light Pi, and is, for example, a single-mode rectangular waveguide.

The MMI coupler 62 (a splitting portion) is an element that utilizes multi-mode interference to split input single-mode light into plural outputs (ten, in the present exemplary embodiment). The propagating light split by the MMI coupler 62 propagates through waveguides 68-1 to 68-10 (collectively referred to as "waveguides 68" hereafter).

Each of the waveguides 68-1 to 68-10 (modulation waveguides) is connected to one of the single-mode waveguides 34-1 to 34-10 of the diffraction grating array 50.

The phase modulator 61 includes the waveguides 68-1 to 68-10 and heaters 64-1 to 64-10 (collectively referred to as "heaters 64" hereafter) that are each disposed above the waveguides 68-1 to 68-10. The phase modulator 61 is configured as a thermo-optic phase modulator. The thermo-optic effect describes a property by which refractive index is modified as temperature increases. In the phase modulator 61, the refractive indexes of the waveguides 68 are modified by applying heat to the waveguides 68 using the heaters 64 (heating portions). The effective optical path lengths of the waveguides are modified as the refractive indexes of the waveguides 68 are modified, thus the phase of propagating light propagating through the waveguides 68 can be modified.

Each of the heaters 64-1 to 64-10 is configured so as to be settable by an independent current flow therethrough, and is configured such that a respective heating amount can be individually set. Namely, it is possible to independently set the phases of the propagating light propagating through each of the waveguides 68-1 to 68-10.

The propagation direction of output light Po from the diffraction grating array 50 is determined by the wave front linking the phases of propagating light propagating through each of the waveguides 68-1 to 68-10. In the phase modulator 61 configured as above, it is therefore possible to individually adjust the phase of light propagating through each of the waveguides 68-1 to 68-10 in accordance with the propagation direction for the output light Po and scan the output light Po.

As explained in detail above, the optical phased array according to the present exemplary embodiment enables the occurrence of grating lobes to be suppressed, and enables a simply manufactured optical phased array to be provided.

Fourth Exemplary Embodiment

Explanation follows regarding a diffraction grating 70 and diffraction grating 80 according to the present exemplary embodiment, with reference to FIG. 8A to FIG. 10. The diffraction gratings 70 and 80 are of a configuration in which parts acting as diffraction gratings are formed as holes instead of being formed as recesses.

Figure 8A:
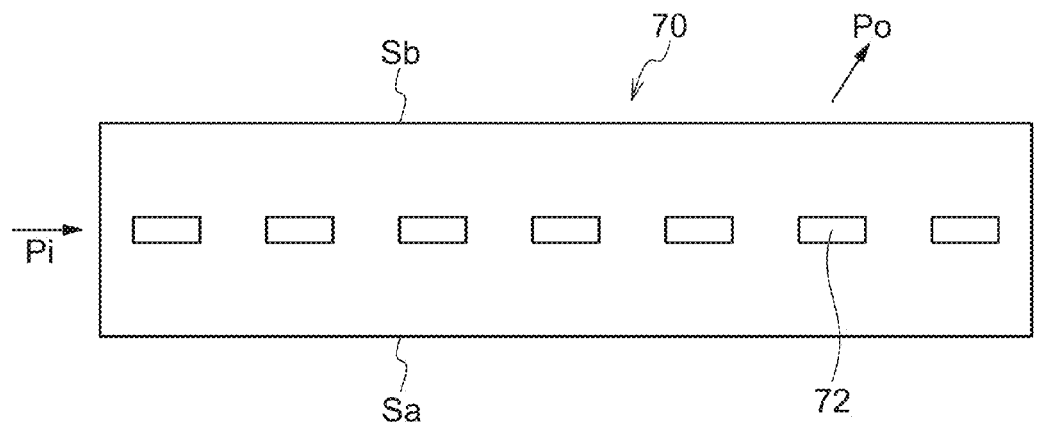
FIG. 8A is a plan view illustrating an example of configuration of a diffraction grating according to a fourth exemplary embodiment.
Figure 8B:
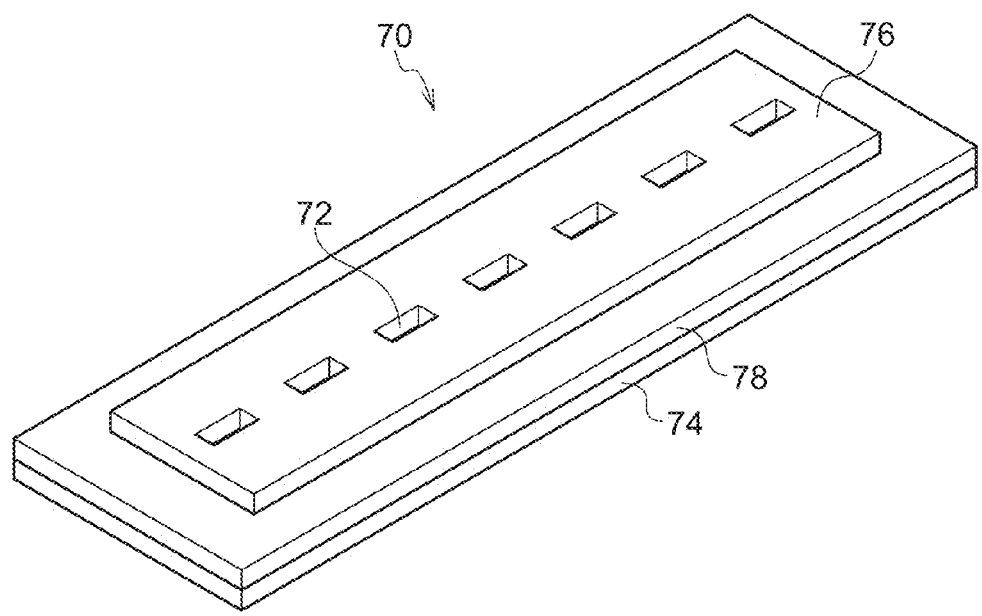
FIG. 8B is a perspective view illustrating an example of configuration of a diffraction grating according to a fourth exemplary embodiment.

As illustrated in FIG. 8B, the diffraction grating 70 is configured including a Si substrate 74, a SiO$_2$ layer 78 formed above the substrate 74, and a Si side-wall layer 76 formed above the SiO$_2$ layer 78. Similarly to the diffraction grating 10, the diffraction grating 70 also includes a cladding layer covering the side-wall layer 76. As illustrated in FIG. 8A and FIG. 8B, the side-wall layer 76 is formed with plural holes (an opening section) 72 formed arranged along a specific direction. The holes 72 act as a diffraction grating. Namely, input light Pi input from one end of the diffraction grating 70 is diffracted while propagating through the diffraction grating 70, and is radiated as output light Po.

Similarly to the diffraction grating 10 above, the holes 72 are formed in the side-wall layer 76 of the diffraction grating 70. The side faces Sa, Sb on opposite sides of where the holes 72 of the side-wall layer 76 are formed have no bearing on the diffraction phenomenon, thus even when plural diffraction gratings 70 are disposed adjacent to each other, there is no optical coupling between neighboring diffraction gratings 70. Accordingly, the occurrence of grating lobes can be suppressed even when the diffraction gratings 70 are arranged close together.

Figure 9A:
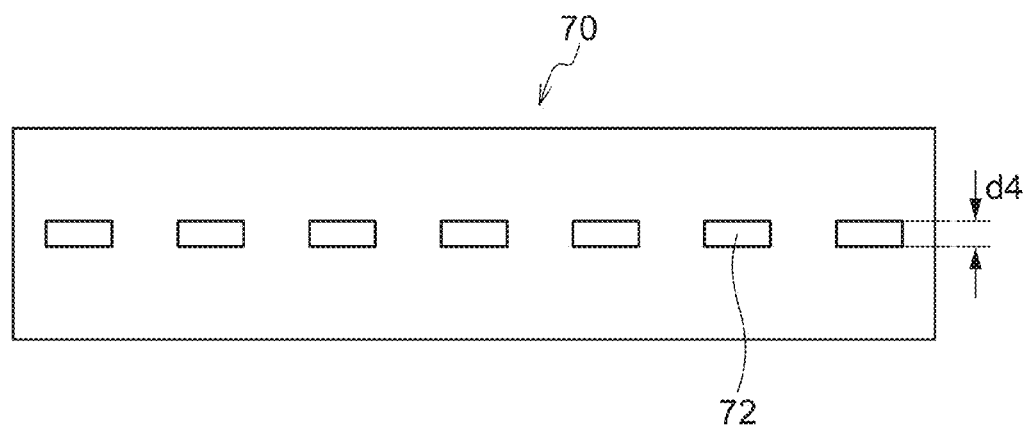
FIG. 9A is a plan view for explaining the adjustment of coupling efficiency in a diffraction grating according to a fourth exemplary embodiment.
Figure 9B:
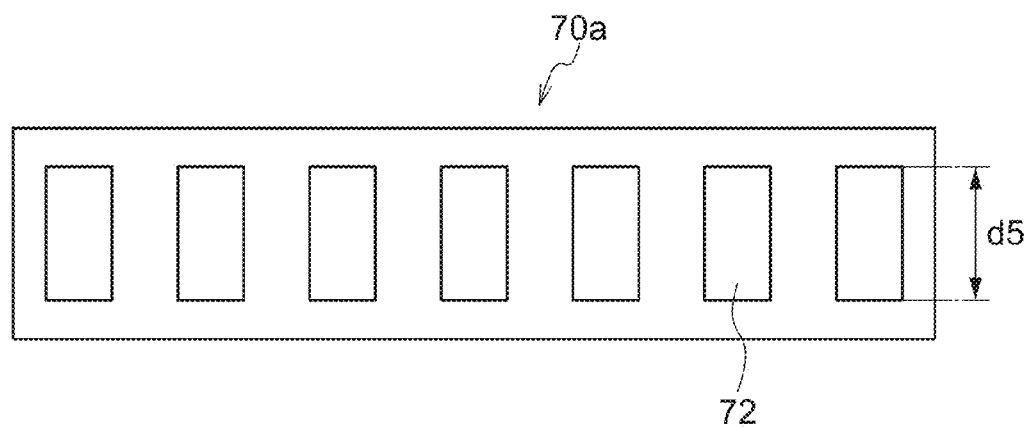
FIG. 9B is a plan view for explaining the adjustment of coupling efficiency in a diffraction grating according to a fourth exemplary embodiment.

FIG. 9A and FIG. 9B illustrate a method of adjusting the coupling efficiency η of the diffraction grating 70 between the diffraction grating and a waveguide. As illustrated in FIG. 9A, the width of the holes 72 of the diffraction grating 70 is d4. By widening the width of the holes 72 to d5 (>d4), as in a diffraction grating 70a illustrated in FIG. 9B, the coupling efficiency of the diffraction grating 70a can be increased compared to the coupling efficiency of the diffraction grating 70.

Note that the diffraction grating 70 can be manufactured by a manufacturing method similar to the method of manufacturing the diffraction grating 10 explained using FIG. 3A to FIG. 3C.

Figure 10:
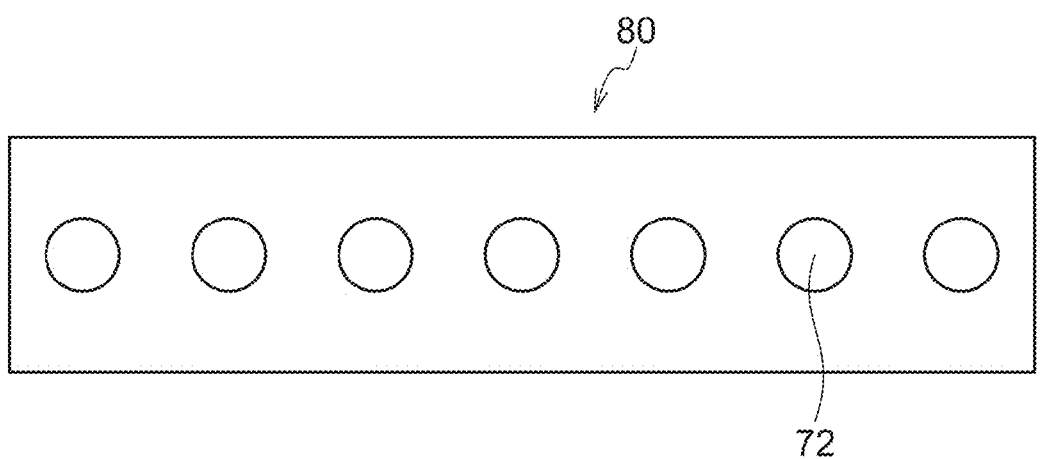
FIG. 10 is a plan view illustrating another diffraction grating configuration according to a fourth exemplary embodiment.

In the present exemplary embodiment, although explanation has been given regarding an example of configuration in which the shape of the holes 72 is rectangular, there is no limitation thereto, and configuration may be such that the shape of the holes 72 is, for example, circular, elliptical, or the like. FIG. 10 illustrates a configuration in which the shape of the holes 72 is circular.

As explained in detail above, the diffraction grating according to the present exemplary embodiment enables the occurrence of grating lobes to be suppressed, and enables a simply manufactured optical phased array to be provided.

Fifth Exemplary Embodiment

Figure 11A:
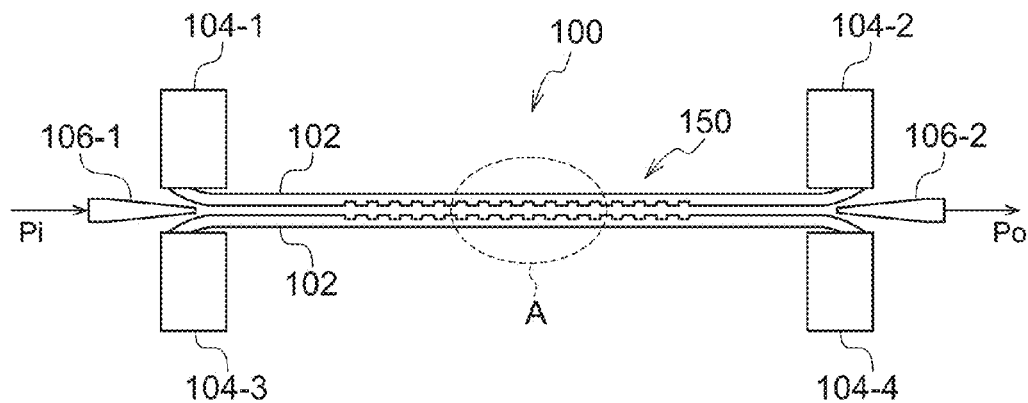
FIG. 11A is an overall plan view of an optical modulator according to a fifth exemplary embodiment.

Explanation follows regarding an optical modulator 100 according to the present exemplary embodiment, with reference to FIG. 11A to FIG. 14B. The optical modulator 100 is of a configuration in which a diffraction structure according to the present disclosure is applied to an optical modulator. As illustrated in FIG. 11A, the optical modulator 100 according to the present exemplary embodiment is configured including a diffraction section 150 and electrodes 104-1, 104-2, 104-3, 104-4. Similarly to the diffraction grating 10 illustrated in FIG. 1A to FIG. 1C, the optical modulator 100 is formed above a substrate.

Figure 11B:
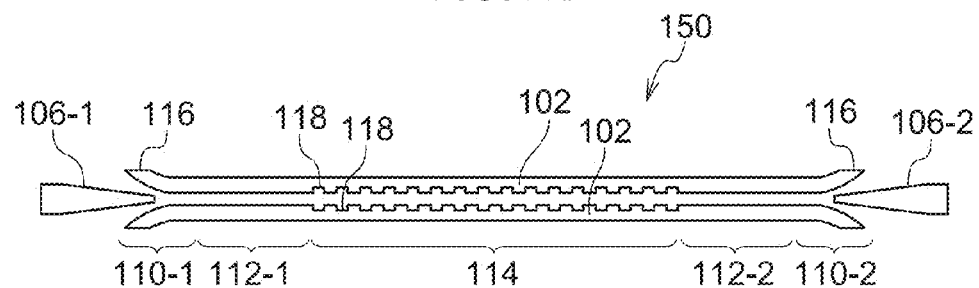
FIG. 11B is a plan view of a diffraction section of an optical modulator according to a fifth exemplary embodiment.

FIG. 11B illustrates the diffraction section 150 in detail. As illustrated in FIG. 11B, the diffraction section 150 is configured including a diffraction structure 114; slot-waveguides 112-1, 112-2; mode converters 110-1, 110-2; and single-mode waveguides 106-1, 106-2. The mode converters 110-1, 110-2 each include a coupling portion 116. The function of the slot-waveguides 112-1, 112-2; the mode converters 110-1, 110-2; the single-mode waveguides 106-1, 106-2; and the coupling portions 116 are respectively similar to that of the slot-waveguide 36, the mode converter 32, the single-mode waveguide 34, and the coupling portions 32a, 32b illustrated in FIG. 4, and so detailed explanation thereof is omitted.

Figure 11C:
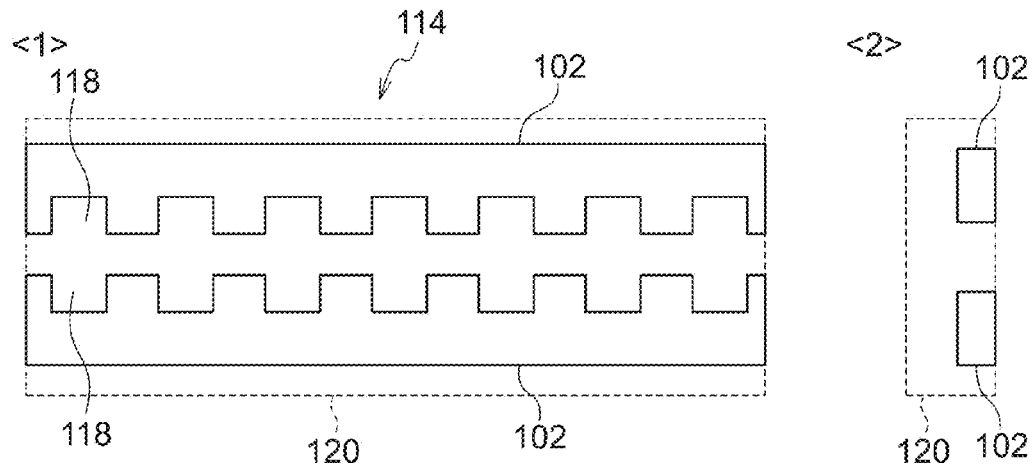
FIG. 11C is a plan view of a diffraction structure of an optical modulator according to a fifth exemplary embodiment.

FIG. 11C illustrates the diffraction structure 114 in detail (the portion encircled by the dashed line indicated by reference sign A in FIG. 11A). <1> illustrated in FIG. 11C is a plan view of the diffraction structure 114, and <2> illustrated in FIG. 11C is a side view of the diffraction structure 114. As illustrated in FIG. 11C, the diffraction structure 114 includes side-wall layers 102 and recesses 118, and the periphery of the diffraction structure 114 is covered by an EO polymer 120.

Referring again to FIG. 11A, the electrodes 104-1 to 104-4 illustrated in FIG. 11A are each connected to a coupling portion 116. When the optical modulator 100 is operated, both power and a modulation signal are applied across the electrodes 104-1 and 104-2, and across the electrodes 104-3 and 104-4. Impurities have been added to the side-wall layer 102 (mode converters 110-1, 110-2; slot-waveguides 112-1, 112-2; and diffraction structure 114) between the electrodes 104-1 and 104-2, thus enabling current to flow between the electrodes 104-1 and 104-2. The side-wall layer 102 between electrodes 104-3 and 104-4 is similarly configured. Namely, in the optical modulator 100, each side-wall layer 102 configures part of an electrode.

The optical modulator 100 according to the present exemplary embodiment phase modulates input light Pi incident from the single-mode waveguide 106-1 on one side, and outputs the modulated input light Pi as output light Po from the single-mode waveguide 106-2 on the other side. When this is performed, the diffraction structure 114 operates as a phase modulator. Light propagating through the optical modulator 100 is confined within the optical modulator 100 by the EO polymer 120, which has a lower refractive index than the refractive index of the side-wall layers 102.

Thus, although the optical modulator 100 according to the present exemplary embodiment has the same structure as the diffraction grating 10 illustrated in FIG. 1A to FIG. 1C, output light Po is transmitted confined within the optical modulator 100 from the single-mode waveguide 106-1 to the single-mode waveguide 106-2 without being radiated toward the outside as in the diffraction grating 10. The reason for this is explained below. Note that in the following, a mode being radiated toward the outside is referred to as the "radiation mode" and a mode being propagated internally confined is referred to as the "guided mode".

Explanation follows regarding the reason that the diffraction structure according to the present disclosure can be selectively used as a diffraction grating, an optical modulator, or an optical filter, described below, with reference to FIG. 12A to FIG. 14B.

Figure 12A:
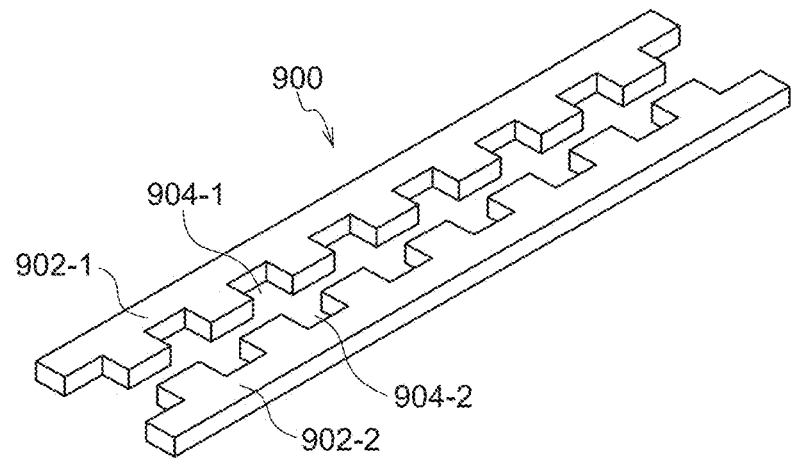
FIG. 12A is a perspective view of a simulation model according to an exemplary embodiment.
Figure 12B:
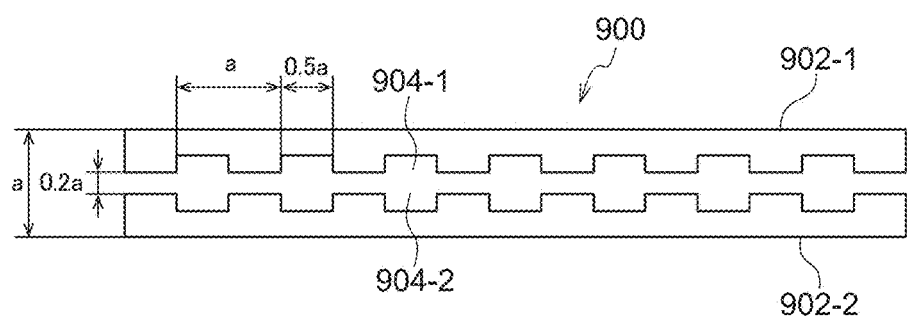
FIG. 12B is a plan view of a simulation model according to an exemplary embodiment.
Figure 12C:
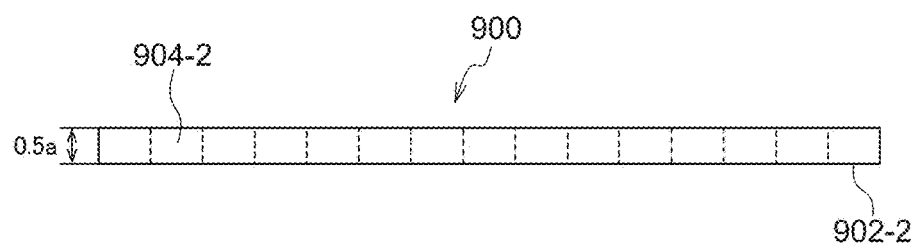
FIG. 12C is a side view of a simulation model according to an exemplary embodiment.

FIG. 12A, FIG. 12B, and FIG. 12C respectively illustrate a perspective view, a plan view, and a side view of a diffraction structure 900, this being configuration shared among the diffraction grating, the optical modulator, and the optical filter according to the present disclosure. As illustrated in FIG. 12A, the diffraction structure 900 includes side-wall layers 902-1, 902-2 and recesses 904-1, 904-2, and the diffraction structure 900 is formed above a substrate. The diffraction structure 900 is covered by a medium having a lower refractive index than the refractive index of the side-wall layers 902-1, 902-2. In the present exemplary embodiment, the medium is referred to as a cladding layer. The material of the side-wall layers 902-1, 902-2 and the cladding layer is not particularly limited, and for example, in the present exemplary embodiment, the side-wall layers 902-1, 902-2 are formed from Si and the cladding layer is formed from $SiO_2$.

Through simulation, an investigation was performed regarding the demarcation between cases in which the radiation mode manifests in the diffraction structure 900 (when functioning as a diffraction grating) and cases in which the guided mode manifests in the diffraction structure 900 (when functioning as an optical modulator or an optical filter). FIG. 12B and FIG. 12C respectively illustrate a plan view and a side view of this simulation model. In FIG. 12B and FIG. 12C, an outside width and an inside width that are orthogonal to the direction of light travel through the diffraction structure 900 are respectively set to a and 0.2a, wherein a is a fixed value. Namely, the ratio of the outside width to the inside width of the diffraction structure 900 is 5:1. In addition, the width of the recesses 904-1, 904-2 is set to 0.05a, and the period of the recesses 904-1, 904-2 is set to a (namely, the interval between recesses is 0.5a). The thickness of the diffraction structure 900 is set to 0.5a.

As a result of simulations performed using the simulation model illustrated in FIG. 12B and FIG. 12C, when the wavelength of light propagated through the diffraction structure 900 was set to 1.5 μm, the guided mode was dominant for a <0.54 μm, where it is apparent that the diffraction structure 900 could be suitably used as an optical modulator or an optical filter. However, the radiation mode was dominant for a >0.54 μm, where it is apparent that the diffraction structure 900 could be suitably used as a diffraction grating.

Figure 13A:
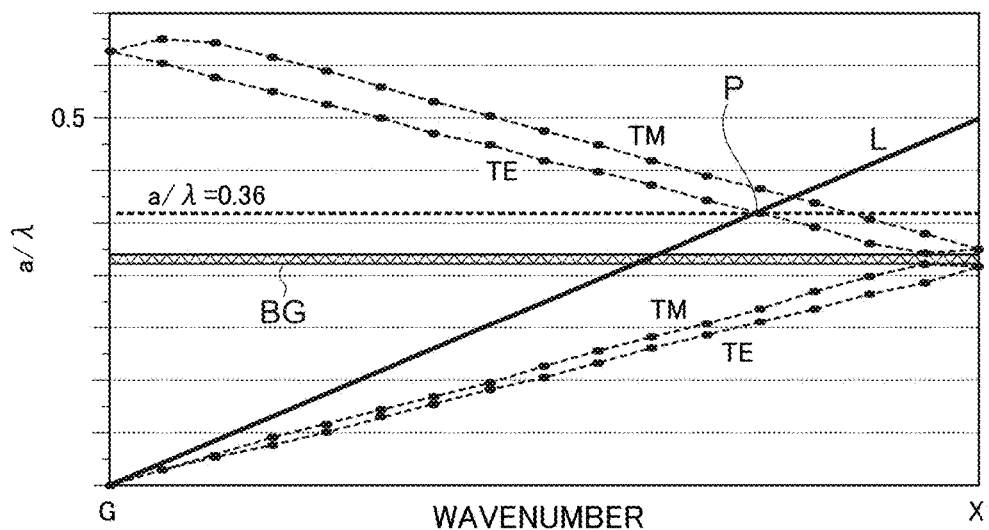
FIG. 13A is a graph illustrating band structure simulation results of a simulation according to an exemplary embodiment.
Figure 13B:
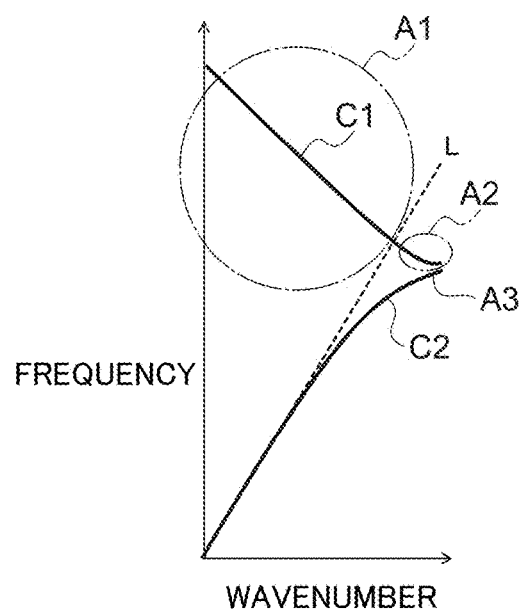
FIG. 13B is a diagram for explaining band structure in a simulation according to an exemplary embodiment.

FIG. 13A illustrates an example of the results of the above simulations. FIG. 13A is the result of a band structure simulation for the diffraction structure 900 illustrated in FIG. 12B, and FIG. 12C. First, explanation is given regarding band structures (photonic band structures) in general, with reference to FIG. 13B. A band structure diagram illustrates the dispersion characteristics of a particular light propagation structure, with the horizontal axis and the vertical axis respectively representing wavenumber and frequency. Curved lines C1 and C2 in FIG. 13B represent dispersion characteristics.

A straight line L, which is tangent to curved line C2, represents a light line through space. The light line L is a straight line at the demarcation between a particular light propagation structure exhibiting radiation characteristics or guided characteristics. Namely, radiation characteristics are exhibited in a region A1 of the dispersion characteristics C1 positioned to the left side (upper side) of the light line L, and guided characteristics are exhibited in a region A2 of the dispersion characteristics C1 positioned to the right side (lower side) of the light line L. Thus, use of the diffraction structure 900 primarily as a diffraction grating is possible in the region A1, and use of the diffraction structure 900 primarily as an optical modulator or an optical filter is possible in the region A2.

In FIG. 13A, which illustrates band structure simulation results, the curved lines labelled TE and TM respectively indicate dispersion characteristics for a TE mode and a TM mode. The light line L and the band gap BG are also illustrated in FIG. 13A. Focusing on the TE mode, note that the intersection point P between the light line L and the TE mode dispersion characteristics is the boundary for switching between the radiation mode and the guided mode. $a/\lambda$ is $a/\lambda=0.36$ at the intersection point P. Note that $\lambda$ is the wavelength of light propagating through the diffraction structure 900. When $\lambda$ is set to 1.5 μm, $a=0.36\cdot\lambda=0.36\times 1.5=0.54$ μm, thus the guided mode is dominant in the diffraction structure 900 for a <0.54 μm, and the characteristics of the diffraction structure 900 are primarily suited to an optical modulator or an optical filter. However, the radiation mode is dominant for a >0.54 μm, and the characteristics of the diffraction structure 900 are primarily suited to a diffraction grating.

Figure 14A:
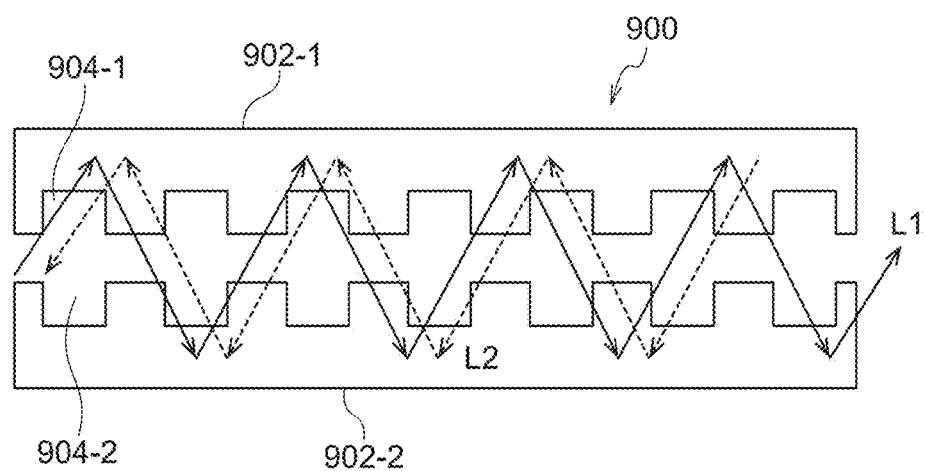
FIG. 14A is a diagram for explaining the occurrence of slow light in a diffraction structure according to an exemplary embodiment.

Slow light occurs in a region A3, this being a region where the curved line C2 approaches parallelism with the horizontal axis, namely, in a region where the differential value of the curved line C2 approaches 0. Slow light is light that has a very low speed with respect to propagating light propagating through the diffraction structure 900. Explanation follows regarding the reason why slow light occurs in the diffraction structure 900, with reference to FIG. 14A and FIG. 14B. FIG. 14A illustrates a state of light propagating through the diffraction structure 900 according to the present exemplary embodiment, in which a light ray L1 that has been input from the left side is repeatedly reflected within the diffraction structure 900 and is output from the right side. As a result of the recesses 904-1, 904-2 of the diffraction structure 900 forming a microstructure, part of the incident light ray L1 is returned to the input side of the diffraction structure 900 as light ray L2. This back-and-forth and zigzag travel is repeated, thus significantly slowing down light travel through the diffraction structure 900. This is the reason that slow light occurs in the diffraction structure 900.

Figure 14B:
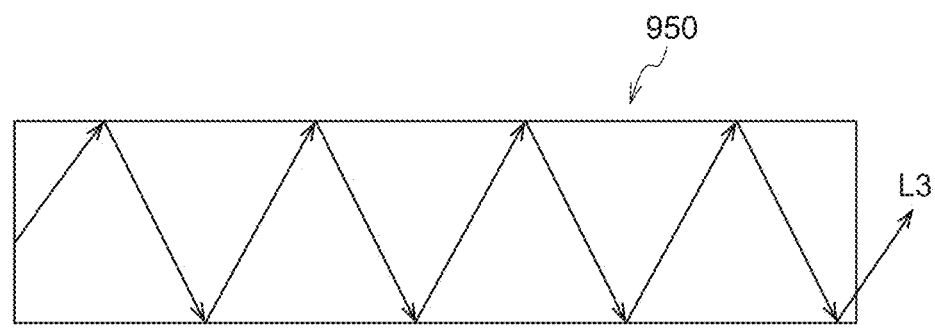
FIG. 14B is a diagram for explaining light travel through a standard waveguide of a diffraction structure according to an exemplary embodiment.

FIG. 14B illustrates a standard waveguide for the purpose of comparison against the diffraction structure 900. This waveguide has, for example, a structure in which a Si core is covered by a cladding layer of $SiO_2$. As illustrated in FIG. 14B, in the case of a standard waveguide, an input light ray L3 is repeatedly reflected and output as-is. Accordingly, there is no modification to the speed of travel of the light ray L3.

The diffraction structure 114 illustrated in FIG. 11C has basically similar functionality to the diffraction structure 900 described above, and operates similarly. Therein, for example, the applied wavelength is set to 1.5 μm and the value of a illustrated in FIG. 12B and FIG. 12C is configured smaller than 0.54 μm. Accordingly, with the optical modulator 100 according to the present exemplary embodiment, propagating light can be confined within a narrow range by a diffraction structure 114 having a slot-waveguide, and a nonlinear effect due to the effect of slow light is increased. As a result, modulation efficiency is increased, enabling the optical modulator to be configured with an extremely short length. This enables the length of the modulation electrodes, namely, the length from the electrode 104-1 to the electrode 104-2, or the length from the electrode 104-3 to the electrode 104-4, to be shortened. Moreover, lumped-parameter electrodes are sufficient since traveling-wave electrodes do not necessarily have to be adopted, frequency characteristics are improved, and high frequency operation is possible.

Note that in the present exemplary embodiment, although explanation has been given using an example in which the diffraction structure according to the present disclosure is applied to a phase modulator, there is no limitation thereto, and application may be made to a Mach-Zehnder (MZ) optical modulator. In such case, an optical modulator 100 according to the present exemplary embodiment may be disposed in each of the two arms of the MZ modulator.

Sixth Exemplary Embodiment

Figure 15A:
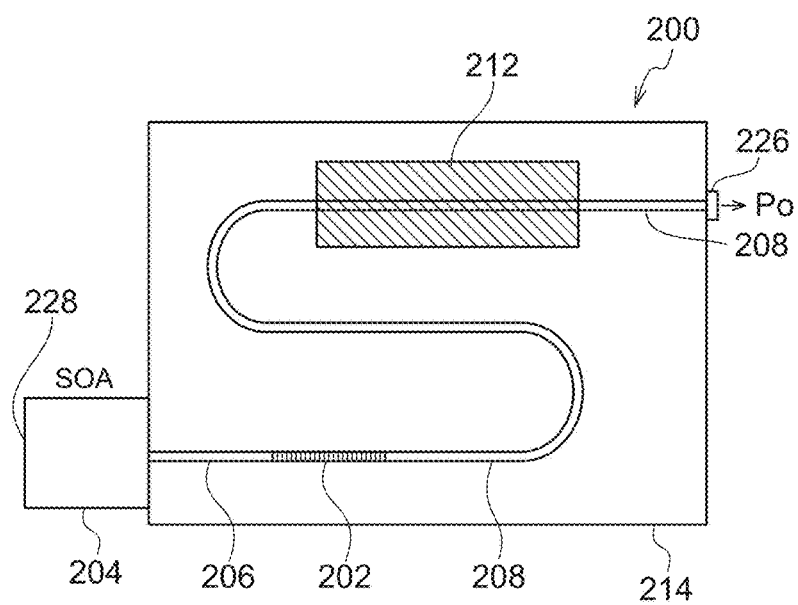
FIG. 15A is a plan view of a laser source according to a sixth exemplary embodiment.
Figure 15B:
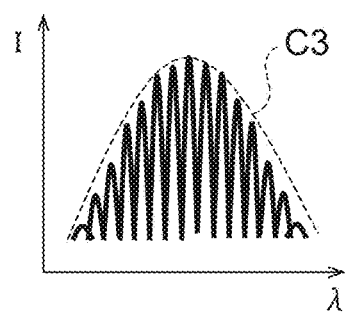
FIG. 15B is a graph illustrating optical filter transmission characteristics.
Figure 15C:
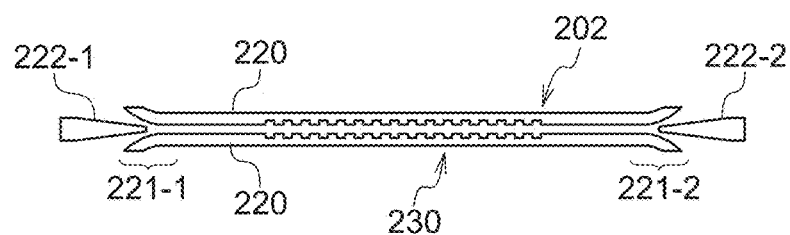
FIG. 15C is a plan view of an optical filter.
Figure 15D:
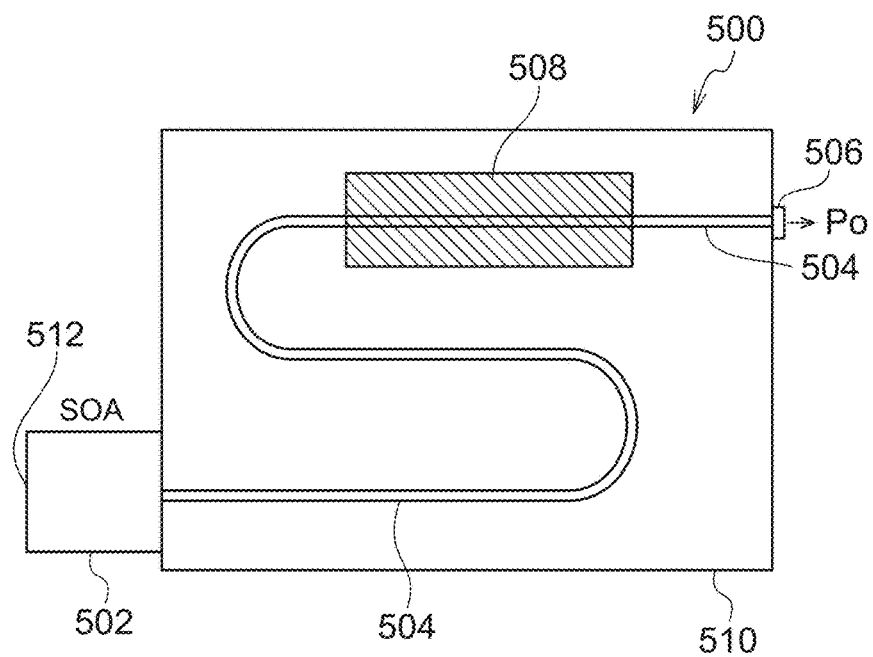
FIG. 15D is a plan view of a laser source according to a comparative example.
Figure 15E:
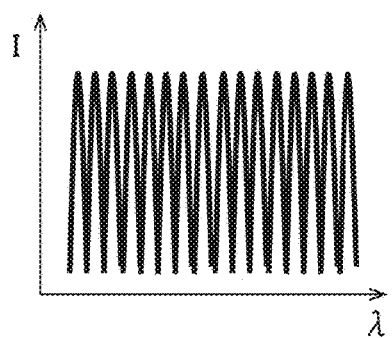
FIG. 15E is a graph illustrating Fabry-Pérot modes.
Figure 16:
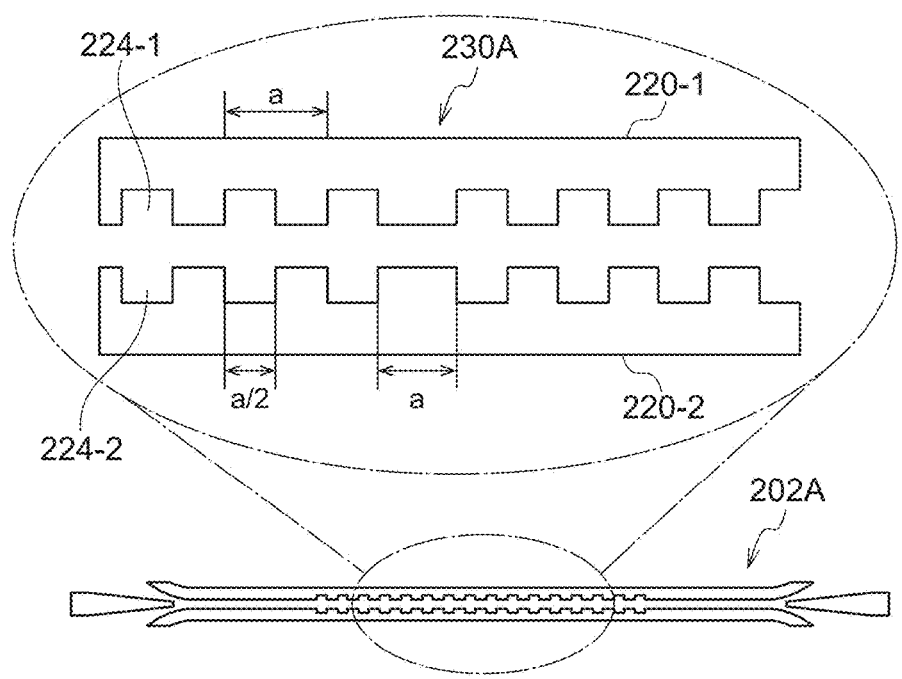
FIG. 16 is a plan view illustrating a quarter-wave-shift optical filter according to a sixth exemplary embodiment.

Explanation follows regarding an optical filter 202 and a laser source 200 according to the present exemplary embodiment, with reference to FIG. 15A to FIG. 16. In the present exemplary embodiment, a diffraction structure according to the present disclosure is applied to the optical filter 202, and the optical filter 202 configures part of the laser source 200.

As illustrated in FIG. 15A, the laser source 200 according to the present exemplary embodiment is configured including the optical filter 202 formed above a substrate 214; waveguides 206, 208; a heater 212; a half-mirror (a partially transmissive mirror) 226 provided at an end face of a waveguide 208, and a semiconductor optical amplifier (SOA) 204. A resonator is configured between a rear end face 228 of the SOA 204 and the half-mirror 226 in the laser source 200, which oscillates at the resonance frequency of the resonator. When this occurs, the bandwidth of the laser source 200 is restricted by the optical filter 202, this being a bandpass filter, and the laser source 200 functions as a narrow-linewidth light source. The oscillation frequency can also be changed using the heater 212.

The SOA 204 is a light source for producing oscillating light from the laser source 200. The output end of the SOA 204 is optically coupled to the waveguide 206. As described above, the rear end face 228 of the SOA 204 on the opposite side of the SOA 204 to a light emitting side configures a reflecting face. The rear end face 228 of the SOA 204 and the half-mirror 226 form reflecting end faces of the resonator. The waveguide 206 facing the emitting end of the SOA 204 may be provided with a spot-size converter that adjusts the difference between the spot size of light at the emitting end of the SOA 204 and the spot size of the waveguide 206.

The heater 212 is disposed over the waveguide 208, and is configured to apply heat to the waveguide 208 so as to modify the refractive index of the waveguide 208. Applying heat to the waveguide 208 modifies the refractive index of the waveguide 208. The effective resonator length of the resonator described above is modified as a result, enabling the wavelength of output light Po output from the laser source to be modified. Note that configuration for changing the refractive index of the waveguide 208 is not limited thereto, and for example, another structure capable of changing the refractive index, such as a current injecting structure, a voltage applying structure, or a carrier plasma effect structure, may be employed.

The waveguides 206, 208 according to the present exemplary embodiment have, for example, a single-mode configuration with a rectangular cross-section structure. However, there is no limitation thereto, and configuration may be made using slot-waveguides. In such a case, the mode converters 221-1, 221-2 described below are unnecessary.

As illustrated in FIG. 15C, the optical filter 202 includes a diffraction structure 230; side-wall layers 220 formed with mode converters 221-1, 221-2; and single-mode waveguides 222-1, 222-2. The optical filter 202 is structured similarly to the diffraction section 150 illustrated in FIG. 11A to FIG. 11C. Accordingly, detailed explanation of the function of these portions is omitted. The optical filter 202 is disposed between the waveguides 206 and 208, and restricts the bandwidth of light propagating through the waveguides 206, 208.

FIG. 15D illustrates a laser source 500 according to a comparative example that does not include an optical filter 202. As illustrated in FIG. 15D, the laser source 500 includes a waveguide 504 formed above a substrate 510, a heater 508, a half-mirror 506 provided at an end face of the waveguide 504, and a SOA 502. The half-mirror 506 and a rear end face 512 of the SOA 502 configure a resonator with resonation end faces in the laser source 500. FIG. 15E illustrates the wavelength characteristics of output light Po emitted from the laser source 500, with the horizontal axis and the vertical axis respectively representing wavelength λ and optical intensity I. As illustrated in FIG. 15E, in the laser source 500, as a result of the resonator described above a large number of Fabry-Pérot modes occur, and wavelength is adjusted using the heater 508.

FIG. 15B illustrates wavelength characteristics of output light Po emitted from the laser source 200 according to the present exemplary embodiment. The transmission characteristics of the optical filter 202 are illustrated by the curved line C3 indicated as a dashed line in FIG. 15B. Namely, the optical filter 202 is configured such that the bandwidth of Fabry-Pérot modes produced by the resonator configured by the half-mirror 226 and the rear end face 228 is restricted, and such that a particular wavelength of the large number of Fabry-Perot modes can be selected (such that transmission loss of the particular wavelength is reduced). Configuration is also such that the particular wavelength selected can be changed using the heater 212. This is because generally in laser oscillation, a low-loss, high-gain mode preferentially oscillates and carriers of other modes are consumed.

Explanation follows regarding an optical filter 202A, this being a modified example of the optical filter 202, with reference to FIG. 16. The optical filter 202A is similar to the optical filter 202 at portions outside of the diffraction structure, thus explanation will center on parts of the diffraction structure.

As illustrated in FIG. 16, the optical filter 202A includes a diffraction structure 230A in place of the diffraction structure 230. As illustrated in FIG. 11C, recesses 118 of a constant width are arranged at a constant pitch in the diffraction structure 230. However, in the present exemplary embodiment, some of the widths of the recesses, or the pitch of arrangement of some of the recesses may be varied. As illustrated in FIG. 16, in the diffraction structure 230A, some of the widths between recesses, these being a/2 at other portions, are changed to a. Such a structure is generally referred to as a quarter-wave-shift structure and enables more exact control over optical filter transmission characteristics. The optical filter according to the present exemplary embodiment adopts a configuration in which recesses are provided to side-wall layers 220-1, 220-2 along the horizontal direction (a direction parallel to the substrate). Thus, compared to related art, formation of the quarter-wave-shift structure is simpler, and configuration is such that apodization control (generally referring to changing pitch in the diffraction grating to control the bandwidth) can be more easily performed.

A narrow-linewidth light source having an extremely narrow spectral width can be realized by a laser source 200 with the above configuration. Moreover, in such a laser source 200, a slot-waveguide configures a path for oscillating light, and configuration is such that oscillating light passes through a slot region (between the two side-wall layers 220 of the optical filter 202 illustrated in FIG. 15C) in the slot-waveguide. The slot portion is filled with a material in which nonlinear optical effects are less likely to arise than in the side-wall layers 220, for example $SiO_2$, enabling comparatively high optical power to be passed therethrough, and enabling an increase in the output power of the laser source. In cases in which an increase in output power is desired, the interval between the two side-wall layers may be increased so as to enlarge the slot width.

Note that in each of the above exemplary embodiments, although the temperature characteristics of the material configuring the side-wall layers and of the material of the cladding covering the side-wall layers was not touched upon, a configuration may be adopted that takes such temperature characteristics into consideration. Namely, the temperature characteristics of the material configuring the side-wall layers and the temperature characteristics of the material of the cladding covering the side-wall layers may be selected such that the materials have opposite characteristics. In such cases, the temperature characteristics of the respective diffraction structure according to the present disclosure can be improved (temperature dependence can be suppressed), enabling for example, a laser source having a low temperature dependence to be realized.

An object of the present disclosure is to provide a diffraction structure in which the occurrence of grating lobes is suppressed and that can be easily manufactured, and provides a diffraction grating, a diffraction grating array, an optical phased array, an optical modulator, an optical filter, and a laser source that employ this diffraction structure.

A diffraction structure of a first aspect includes a supporting layer, a high refractive index layer, and a low refractive index layer. The high refractive index layer has a first refractive index, is formed above the supporting layer, configures a waveguide guiding input light input from an input terminal along a specific direction, and includes an opening section formed along the specific direction. The low refractive index layer has a second refractive index lower that the first refractive index, and is formed so as to cover the high refractive index layer and fill the opening section. The opening section modifies the input light in at least one of direction or speed according to a wavelength of the input light, and outputs the modified light as output light.

A diffraction grating of a second aspect includes the diffraction structure of the first aspect in which the opening section is configured by serial openings formed in a series along the specific direction, the high refractive index layer is divided by the serial openings into a first layer and a second layer, and plural recess pairs configured by a portion of the serial openings are formed by notching the first layer and the second layer at a predetermined length in a direction intersecting the specific direction in a plane of the high refractive index layer. In the second aspect, the waveguide is configured as a slot-waveguide by the first layer, the second layer, and the low refractive index layer filled between the first layer and the second layer, and the diffraction structure configures a diffraction section that diffracts the input light and radiates the diffracted light as output light.

A third aspect is the second aspect, wherein the diffraction efficiency of the diffraction section is set by the predetermined length.

A fourth aspect is the second aspect or the third aspect, wherein the predetermined length is configured as a length that gradually increases on progression along the specific direction from the input terminal.

A fifth aspect is any one of the second aspect to the fourth aspect, further including a single-mode waveguide that inputs the input light, and a mode conversion section that connects the single-mode waveguide to the input terminal and that converts single-mode light to a slot-mode.

A sixth aspect includes the diffraction structure of the first aspect in which the opening section includes plural holes arranged along the specific direction. In the sixth aspect, the diffraction structure configures a diffraction section that diffracts the input light and radiates the diffracted light as output light.

A seventh aspect is the sixth aspect, wherein the diffraction efficiency of the diffraction section is set by a length of each of the plural holes in a direction intersecting the specific direction.

A diffraction grating array of the eighth aspect includes plural of the diffraction gratings of any one of the second aspect to the seventh aspect disposed adjacent to each other in a direction intersecting the specific direction.

An optical phased array of a ninth aspect includes an input waveguide, a splitting portion, a phase modulator, and the diffraction grating array of the eighth aspect. The input waveguide is input with the input light. The splitting portion is connected to the input waveguide and includes plural output terminals outputting plural respective split beams split from the input light. The phase modulator includes plural modulation waveguides each connected to one of the plural output terminals, includes plural heating portions each provided near one of the plural modulation waveguides, and heats each of the plural modulation waveguides using the plural respective heating portions so as to modulate respective phases of the plural split beams. In the diffraction grating array of the eighth aspect, plural of the input terminals are each connected to one of the plural the modulation waveguides. In the ninth aspect, the direction of travel of radiated light is controlled by changing the respective phases of the plural split beams using the phase modulator.

An optical modulator of a tenth aspect includes the diffraction structure of the first aspect in which the opening section is configured by serial openings formed in a series along the specific direction, the high refractive index layer is divided by the serial openings into a first layer and a second layer, and plural recess pairs configured by a portion of the serial openings are formed by notching the first layer and the second layer at a predetermined length in a direction intersecting the specific direction in a plane of the high refractive index layer. The optical modulator of the tenth aspect also includes a pair of first electrodes that are disposed at both ends of the first layer, and a pair of second electrodes that are disposed at both ends of the second layer. In the tenth aspect, the waveguide is configured as a slot-waveguide by the first layer, the second layer, and the low refractive index layer filled between the first layer and the second layer, and the diffraction structure configures a modulation section that modulates the input light and emits the modulated light as output light.

An optical filter of an eleventh aspect includes the diffraction structure of the first aspect in which the opening section is configured by serial openings formed in a series along the specific direction, the high refractive index layer is divided by the serial openings into a first layer and a second layer, and plural recess pairs configured by a portion of the serial openings are formed by notching the first layer and the second layer at a predetermined length in a direction intersecting the specific direction in a plane of the high refractive index layer. In the eleventh aspect, the waveguide is configured as a slot-waveguide by the first layer, the second layer, and the low refractive index layer filled between the first layer and the second layer, and the diffraction structure configures a filter section that controls a bandwidth of the input light and emits the bandwidth-controlled light as output light.

A twelfth aspect is the eleventh aspect, wherein the plural recess pairs are disposed so as to configure a quarter-wave-shift structure.

A laser source of a thirteenth aspect includes the optical filter of the eleventh aspect or the twelfth aspect, a first waveguide, a second waveguide, a semiconductor optical amplifier, a heating portion, and a partially transmissive mirror. The first waveguide has an output section that is connected to one end of the optical filter. The second waveguide has an input section that is connected to another end of the optical filter. The semiconductor optical amplifier has a light emitting portion that is connected to an input section of the first waveguide, and has an end face on an opposite side to the light emitting portion configured as a reflecting portion. The heating portion is provided in proximity to at least one of the first waveguide or the second waveguide. The partially transmissive mirror is disposed at the output section of the second waveguide. In the thirteenth aspect, the reflecting portion and the partially transmissive mirror configure a resonator that generates a laser beam, and the laser beam is emitted from the partially transmissive mirror.

The present disclosure provides a diffraction structure in which the occurrence of grating lobes is suppressed and that can be easily manufactured, and provides a diffraction grating, a diffraction grating array, an optical phased array, an optical modulator, an optical filter, and a laser source that employ this diffraction structure.

What is claimed is:

1. A diffraction structure comprising:
    a supporting layer;
    a high refractive index layer that has a first refractive index, that is formed on the supporting layer, that configures a waveguide which guides input light input from an input terminal along a specific direction, and that includes an opening section formed along the specific direction; and
    a low refractive index layer that has a second refractive index lower than the first refractive index, and that is formed so as to cover the high refractive index layer and fill the opening section,
    the opening section passing through the high refractive index layer from a top surface of the high refractive index layer to a bottom surface of the high refractive index layer, and
    the opening section modifying the input light in at least one of direction or speed, according to a wavelength of the input light, and outputting the modified input light as output light.

2. A diffraction grating comprising:
    the diffraction structure of claim 1 in which the opening section is configured by serial openings formed in a series along the specific direction, the high refractive index layer is divided by the serial openings into a first layer and a second layer, and a plurality of recess pairs configured by some of the serial openings are formed by notching the first layer and the second layer at a predetermined length in a direction intersecting the specific direction, in a plane of the high refractive index layer, wherein:
    the waveguide is configured as a slot-waveguide by the first layer, the second layer, and the low refractive index layer, which is filled between the first layer and the second layer, and
    the diffraction structure configures a diffraction section that diffracts the input light and radiates the diffracted input light as output light.

3. The diffraction grating of claim 2, wherein a diffraction efficiency of the diffraction section is set by the predetermined length.

4. The diffraction grating of claim 2, wherein the predetermined length is configured as a length that gradually increases along the specific direction from the input terminal.

5. The diffraction grating of claim 2, further comprising:
    a single-mode waveguide that inputs the input light; and a mode conversion section that connects the single-mode waveguide with the input terminal and that converts single-mode light to a slot-mode.

6. A diffraction grating comprising:
the diffraction structure of claim 1 in which the opening section includes a plurality of holes arranged along the specific direction,
wherein the diffraction structure configures a diffraction section that diffracts the input light and radiates the diffracted input light as output light.

7. The diffraction grating of claim 6, wherein a diffraction efficiency of the diffraction section is set by a length of each of the plurality of holes in a direction intersecting the specific direction.

8. A diffraction grating array comprising:
a plurality of the diffraction gratings of claim 2 disposed adjacent to each other in a direction intersecting the specific direction.

9. An optical phased array comprising:
an input waveguide that is input with input light;
a splitting portion that is connected to the input waveguide and that includes a plurality of output terminals outputting a plurality of respective split beams split from the input light;
a phase modulator that includes a plurality of modulation waveguides each connected to one of the plurality of output terminals, that includes a plurality of heating portions each provided near one of the plurality of modulation waveguides, and that heats each of the plurality of modulation waveguides using the plurality of respective heating portions so as to modulate respective phases of the plurality of split beams; and
the diffraction grating array of claim 8 in which each of a plurality of the input terminals is connected to one of the plurality of the modulation waveguides,
wherein a direction of travel of radiated light is controlled by changing the respective phases of the plurality of split beams using the phase modulator.

10. An optical modulator comprising:
the diffraction structure of claim 1 in which the opening section is configured by serial openings formed in a series along the specific direction, the high refractive index layer is divided by the serial openings into a first layer and a second layer, and a plurality of recess pairs configured by some of the serial openings are formed by notching the first layer and the second layer at a predetermined length, in a direction intersecting the specific direction in a plane of the high refractive index layer;
a pair of first electrodes that are disposed at both ends of the first layer; and
a pair of second electrodes that are disposed at both ends of the second layer, wherein:
the waveguide is configured as a slot-waveguide by the first layer, the second layer, and the low refractive index layer, which is filled between the first layer and the second layer, and
the diffraction structure configures a modulation section that modulates the input light and emits the modulated input light as output light.

11. An optical filter comprising:
the diffraction structure of claim 1 in which the opening section is configured by serial openings formed in a series along the specific direction, the high refractive index layer is divided by the serial openings into a first layer and a second layer, and a plurality of recess pairs configured by some of the serial openings are formed by notching the first layer and the second layer at a predetermined length, in a direction intersecting the specific direction in a plane of the high refractive index layer, wherein:
the waveguide is configured as a slot-waveguide by the first layer, the second layer, and the low refractive index layer, which is filled between the first layer and the second layer, and
the diffraction structure configures a filter section that controls a bandwidth of the input light and emits the bandwidth-controlled input light as output light.

12. The optical filter of claim 11, wherein the plurality of recess pairs are disposed so as to configure a quarter-wave-shift structure.

13. A laser source comprising:
the optical filter of claim 11;
a first waveguide having an output section that is connected to one end of the optical filter;
a second waveguide having an input section that is connected to another end of the optical filter;
a semiconductor optical amplifier having a light emitting portion that is connected to an input section of the first waveguide, and having an end face, at an opposite side to the light emitting portion, configured as a reflecting portion;
a heating portion that is provided in proximity to at least one of the first waveguide or the second waveguide; and
a partially transmissive mirror that is disposed at the output section of the second waveguide,
the reflecting portion and the partially transmissive mirror configuring a resonator that generates a laser beam, and the laser beam being emitted from the partially transmissive mirror.

* * * * *